United States Patent [19]

Zwack

[11] 4,049,921
[45] Sept. 20, 1977

[54] METHOD FOR FORMING A CONFERENCE CONNECTION IN A TIME DIVISION MULTIPLEX TELECOMMUNICATION SWITCHING SYSTEM

[75] Inventor: Eduard Zwack, Puchheim, Germany

[73] Assignee: Siemens Aktiengesellschaft, Munich, Germany

[21] Appl. No.: 614,513

[22] Filed: Sept. 18, 1975

[30] Foreign Application Priority Data

Sept. 20, 1974   Germany .......................... 2445129

[51] Int. Cl.² ............................................ H04M 3/56
[52] U.S. Cl. ............................ 179/18 BC; 179/15 AL
[58] Field of Search ........... 179/18 BC, 1 CN, 15 AL

[56] References Cited

U.S. PATENT DOCUMENTS

| 3,551,600 | 12/1970 | Berch | 179/18 BC |
|---|---|---|---|
| 3,586,782 | 6/1971 | Thomas | 179/15 AL |
| 3,828,146 | 8/1974 | Lewis | 179/170 NC |
| 3,835,259 | 9/1974 | Medill et al. | 179/18 BC |
| 3,924,082 | 12/1975 | Oliver et al. | 179/18 BC |

Primary Examiner—Thomas W. Brown
Attorney, Agent, or Firm—Schuyler, Birch, Swindler, McKie & Beckett

[57] ABSTRACT

A method for connecting subscribers to form a conference call in a time division multiplex (TDM) telecommunication switching system having a TDM ring-like circuit running from subscriber to subscriber is described. A subscriber speech word is added to a pulse code modulated (PCM) word transferred to the subscriber station, and the summation PCM word is both retransferred and stored in the subscriber station for a time-slot frame. The stored preceding PCM word is subtracted from the PCM word transferred to the subscriber station, and the differential PCM word forms an aural signal.

3 Claims, 2 Drawing Figures

METHOD FOR FORMING A CONFERENCE CONNECTION IN A TIME DIVISION MULTIPLEX TELECOMMUNICATION SWITCHING SYSTEM

BACKGROUND OF THE INVENTION

The invention relates to time division multiplex (TDM) telecommunication switching systems, more particularly pulse code modulation (PCM) telephone switching systems, having a TDM ring-like circuit running from subscriber to subscriber.

TDM telephone switching systems of this type are old in the art (cf. U.S. Pat. No. 3,586,782). In such a telephone switching system, connections may be established such that a plurality of time slots are defined by a central timing station connected in the ring-like circuit, wherein each subscriber station is synchronized to the frame of the time slots by a synchronizing signal emitted by the timing station in a synchronizing time slot. For the establishment of a connection the calling subscriber station uses a time slot identified as free by the timing station and sends in that time slot the signal of the called subscriber station. All currently inoperative subscriber stations supervise all time slots as the reception of their signals and, where necessary, are switched to the connection state in the time slot in which they receive (or have received) their signals.

In telecommunication switching systems, more particularly telephone switching systems, there is frequently the requirement that, in addition to connections between two subscribers, calls known as conference or cut-in calls also be set up between more than two subscribers. Conference calls can simply be set up in switching systems in which the speech information is transferred by means of analog signals by interconnecting the subscriber lines of the subscribers involved directly or via buffer storages. This results in a mixing of the speech signals of all the conferees (cf. U.S. Pat. Nos. 3,293,369 and 3,319,005).

In switching systems operating according to the pulse-code-modulation principle conference calls cannot readily be set up by mixing the various speech signals in view of the generally non-linear modulation characteristic. To conduct conference calls in a PCM telephone switching system, it is known (CCITT documents WP 33/XV No. 6-E of August 1965, page 2, item (3) and WP 33/XV No. 9-E of December 1965, page 10, second paragraph) to convert the PCM signals obtained from the speech signal samples of the parties through non-linear coding, that is, in accordance with a non-linear modulation characteristic, to a linear code, or to "linearize them digitally". The "linear" PCM signals are added in binary fashion and thereafter the composite signals, so obtained, are reconverted to the non-linear code.

A method equivalent to this known method is also found in U.s. Pat. No. 3,575,591. It is likewise known (U.S. Pat. No. 3,575,591) to store temporarily the "non-linear" PCM signals in first registers, convert them to the linear code one after the other by means of a common converter, to store the "linear" PCM signals in second registers, thereafter to add them in an accumulator and, finally, to convert the composite signals obtained to "non-linear" PCM signals with the aid of the converter. U.S. Pat. No. 3,575,591 further recites the routing to each subscriber in a three-party conference circuit of only the composite signals obtained by adding the PCM signals of the other two subscribers. The known conference circuit proceeds from a concentrator switching system to which the individual subscriber stations are connected. It is not suited for exchangeless digital telecommunication systems having a ring-like circuit running from subscriber station to subscriber station.

It is an object of this invention to provide a method for connecting in a conference call at least three subscribers to a TDM telecommunication switching system having a TDM ring-like circuit running from subscriber station to subscriber station.

SUMMARY OF THE INVENTION

In accordance with the invention, the foregoing and other objects are achieved in that in each subscriber station involved in a conference call, the TDM signal displaying the instantaneous value of the speech signal amplitude of the conferee at that station, where appropriate after the necessary non-linear conversion, is added to the TDM signal transmitted over the section of the TDM ring-like circuit connected to an input of the subscriber station in the time position allocated to the conference call. The composite TDM signal, so obtained, is retransmitted over the section of the TDM ring-like circuit continuing from the subscriber station and is, furthermore, stored in the subscriber station for the duration of one signal cycle through the TDM ring-like circuit. The stored preceding composite TDM signal is subtracted from the TDM signal transmitted over the section of the TDM circuit leading to the subscriber station, and the differential TDM signal thus obtained is accepted by the subscriber station as the TDM signal having the instantaneous values of the speech signal amplitudes of the other conferees.

The invention has the advantage that it can set up clearly arranged conference calls (also termed cut-in calls) in a TDM communication facility of the type indicated hereinabove without requiring special central switching means, since the method according to the invention can be performed in the subscriber stations of the TDM telephone system themselves. Another advantage is that the time slot requirements of a conference call are independent of the number of conferees. In a PCM telephone switching system of the type reference hereinabove, only the transfer of a single "linear" PCM word must be taken into account, and this can be placed in two 8-bit frames of two time slots. As a result, conference calls cause the traffic load of the communication facility to increase only insignificantly. Basically, the number of possible conference calls is unlimited when using the method according to the invention.

BRIEF DESCRIPTION OF THE DRAWINGS

The principles of the invention will be more readily understood by reference to the description of a preferred embodiment for carrying out the method of the invention given hereinbelow in conjunction with the accompanying drawings, which are briefly described below.

DETAILED DESCRIPTION OF THE DRAWINGS

Figure 1:
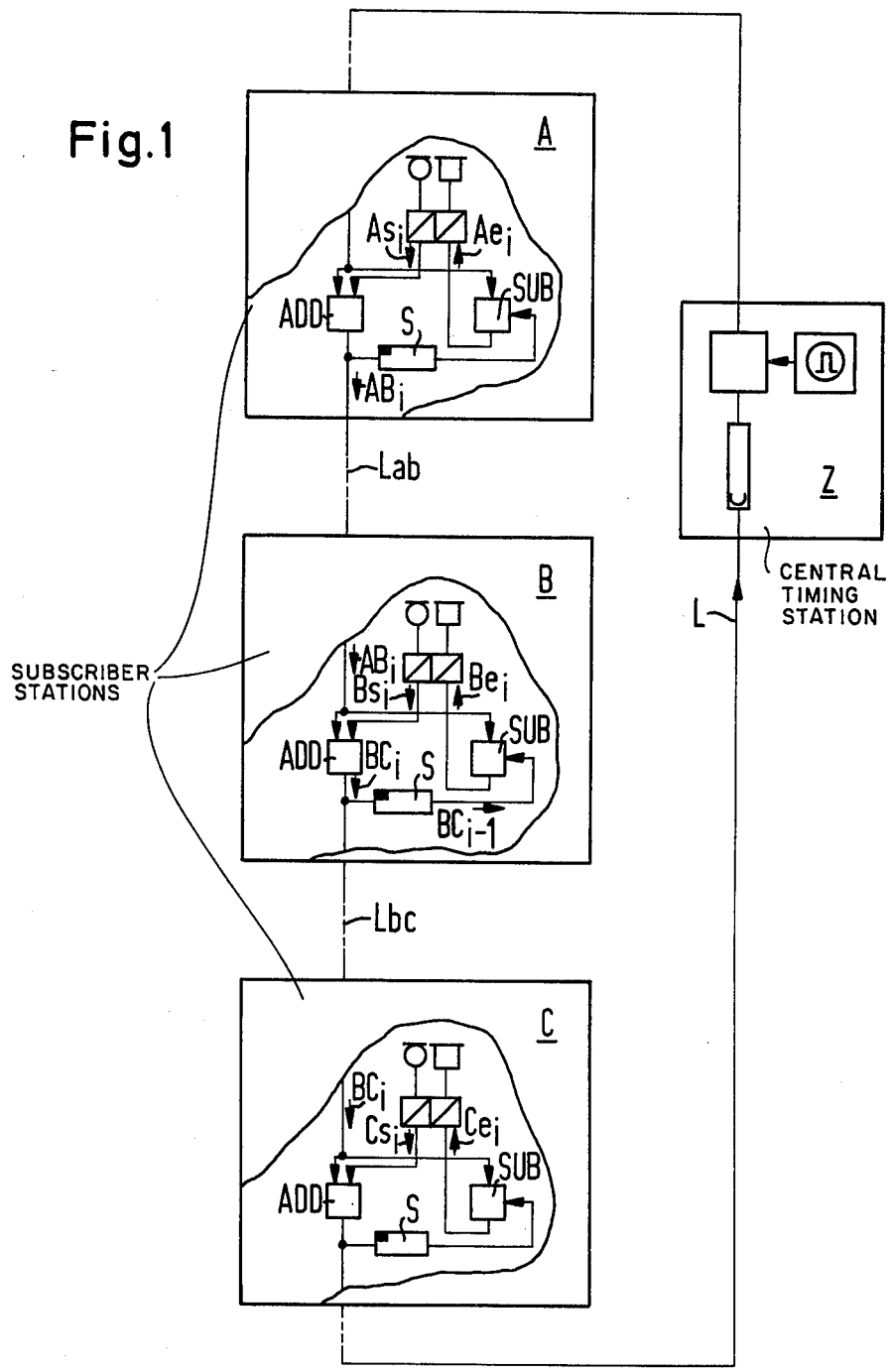
FIG. 1 is a partial schematic diagram of a PCM/TDM telecommunication system for carrying out the method of the invention.

FIG. 1 is simplified for better understanding, and illustrates a TDM communication facility having a TDM ring-like circuit L running from subscriber to subscriber, in which are inserted the subscriber stations A, ... B, ..., C in a manner in itself known (cf. U.S. Pat. No. 3,586,782). It also shows that the TDM ring circuit L has a central timing station Z defining a plurality of time slots in which, where appropriate, at the same time the signal cycle time of the TDM ring circuit can be extended to a whole multiple of the time-slot frame period defined by the timing station Z. Such timing stations are likewise old in the art (cf. U.S. Pat. No. 3,586,782). Basically, in the TDM telecommunication switching system (time-discontinuous) analog signals or (likewise time-discontinuous) digital signals can be transmitted; in particular, it is assumed in the further description that a PCM telephone switching system is involved over whose TDM ring circuit L running from subscriber to subscriber PCM words are transferred that are equivalent to TDM signals.

Calls between every two subscribers can be set up in the TDM switching system shown in FIG. 1, such that each subscriber station A ..., B ..., C ... is synchronized to the frame of the time slots by a synchronizing signal emitted in a synchronizing time slot by the timing station Z. In order to establish a connection the calling subscriber station uses a time slot identified as free by the timing station Z and transmits in that time slot the signal of the called subscriber station to the TDM ring-like circuit. By this means, all unused subscriber stations monitor all time slots as far as the reception of their signal is concerned and, where appropriate, are switched to the connection state in the time slot in which they have received their signal. This is not shown in detail in FIG. 1, since this is not the subject matter of the present invention and is not necessary for practicing it.

Figure 2:
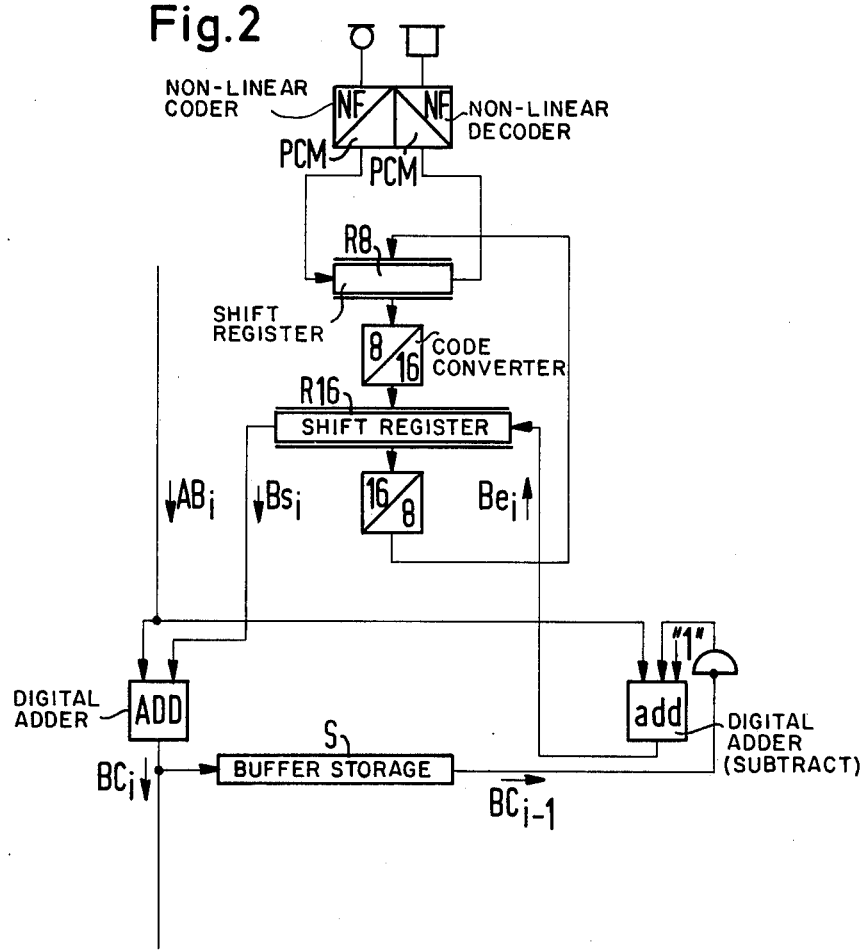
FIG. 2 is a schematic diagram of a subscriber station constructed to operate according to the method of the invention.

In order to be able to connect more than two parties to one another in a conference call, the subscriber stations in the TDM switching system shown in FIG. 1 each have a digital adder ADD and a digital subtractor SUB, as well as a buffer storage S. As shown in FIG. 2, the subtractor may basically be formed from a digital adder to which, in addition to an initial carry "1", the minuend is fed directly and the subtrahend is routed via a NOT element.

The PCM word transferred over the section of the TDM ring circuit L in the time position assigned to the conference call and leading to the subscriber station is routed to one input of the digital adder ADD, as well as to the minuend input of the subtractor SUB of a given subscriber station involved in a conference call. To the other input is coupled the PCM word, where appropriate, after the necessary non-linear to linear code conversion, having the instantaneous value of the speech signal amplitude of the conferee at that subscriber station. A buffer storage S is connected to the output of the digital adder ADD leading to the section of the TDM ring circuit L continuing from the subscriber station. This buffer storage S has an output connected to the subtrahend input of the subtractor SUB. Finally, the subscriber station is connected on the receive side to the output of the subtractor SUB.

For purposes of description it will be assumed that the three subscriber stations A, B and C of a PCM/TDM switching system as shown in FIG. 1 are connected together in a conference call. It is further assumed that in the time position of a time slot frame i allocated to that conference call a PCM word $AB_i$ is transferred over the section Lab of the TDM ring circuit L leading to the subscriber station B. The PCM word $Bs_i$, where appropriate, after non-linear to linear code conversion, has the instantaneous value of the speech signal amplitude of the conferee B and is added in the digital adder ADD of the subscriber station B to the PCM word $AB_i$. The summation or composite PCM word $BC_i$, thus obtained, is transferred over the section Lbc of the TDM ring circuit L continuing from the subscriber station B, so that it travels to the next subscriber station C involved in the conference call.

Moreover, the summation PCM word $BC_i$ obtained in the time position of the time-slot frame i allocated to the conference call is fed to the buffer storage S of the subscriber station B, where it is stored for the duration of a signal cycle of the TDM ring-like circuit L, for which the buffer storage S may preferably be formed from a delay-line storage as shown, for example, in FIG. 4 of U.S. Pat. No. 3,271,521 or in FIG. 5 of the U.S. Pat. No. 3,296,377. The delay line storage can be formed to have a delay time which is equivalent to the signal cycle time.

At the same time, there appears at the output of the buffer storage S of the subscriber station B the preceding composite word $BC_{i-1}$ stored therein from the preceding time-slot frame $i-1$, and which is now subtracted in the subtractor SUB of the subscriber station B from the PCM word $AB_i$ transferred over the section Lab of the TDM ring circuit L. Thus, the following relationship applies for the differential PCM word $Be_i$:

$$Be_i = AB_i - BC_{i-1}$$

$$= AB_i - (AB_{i-1} + Bs_{i-1})$$

$$= AB_{i-1} + Bs_{i-1} + Cs_{i-1} + As_i - (AB_{i-1} + Bs_{i-1})$$

$$= Cs_{i-1} + As_i,$$

where As, Bs and Cs denote the PCM word displaying the instantaneous value of the speech signal amplitude of a respective conferee A or B or C, AB denotes the PCM word transferred in the time position allocated to the conference call over the section Lab of the TDM ring-like circuit leading to the subscriber station B, and BC denotes the PCM word retransferred in the time position allocated to the conference call over the section Lbc of the TDM ring circuit L continuing from the subscriber station B. The subscript $i-1$ indicates that the PCM word appearing in the preceding time-slot frame $i-1$ is involved.

Thus, the differential PCM word $Be_i$ obtained at the output of the subtractor SUB of the subscriber station B displays the last instantaneous values of the speech signal amplitudes of the other conferees C and A, and is hence accepted on the receive side by the subscriber station B as a PCM word displaying the instantaneous values of the speech signal amplitudes, as shown in FIG. 1.

The other subscriber stations involved in the conference call work in analogous fashion, so that each conferee accepts as aural signals only the speech signals of the other conferees.

FIG. 2 shows the circuitry details of an exemplary subscriber station operating according to the method of the invention, in which switching elements corresponding to those in the switching arrangement shown in FIG. 1 are given the same designations.

In the FIG. 2 subscriber station the digital adder ADD and the digital subtractor SUB of the switching arrangement of FIG. 1 are basically constructed as a parallel adder or parallel subtractor. Provided that the TDM ring-like circuit admits of no parallel transmission, all TDM signals in each subscriber station disposed in the TDM ring circuit, therefore, experience a time delay of one time position, or only the TDM signals transmitted within the framework of a conference call experience a time delay of one time-slot frame.

The addition and subtraction may take place in a manner in itself known. Prior to the addition or subraction, the 8-bit PCM words normally produced by a non-linear speech signal coder working according to what is known as the 13-segment characteristic is "linearized digitally" for the reasons stated hereinabove. Before a conferee accepts a "linearly digitized" PCM word as an aural signal, it is reconverted to the non-linear code. The linear digitization normally leads to a 12-bit group which cannot be placed in an eight bit frame of a time slot, so that at least half of it requires one frame of another time slot.

It is of advantage, both from the point of view of circuitry and in order to distinguish clearly when adding several summation PCM words resulting from linear PCM words displaying a maximum (positive or negative) speech signal amplitude or linear PCM words displaying speech signal amplitudes of the other sign (negative or positive) to fully utilize both time frames of both time slots for the accommodation of a linear PCM word, whereby the 12-bit groups mentioned above are conveniently enlarged by adding 4 bits to a linear 16-bit PCM word. Accordingly, in the switching arrangement shown in FIG. 2, the 8-bit PCM word supplied serially by a non-linear speech signal coder NF/PCM is first fed to an 8-bit shift register R8 in order to be input from there in parallel fashion to a non-linear to linear code converter 8/16. This converter produces in parallel fashion the appropriate 16-bit PCM word $Bs_i$ to a 16-bit shift register R16. From there, the 16-bit PCm word $Bs_i$ travels to one input of the digital adder ADD, to whose other input is fed the 16-bit PCM word $AB_i$ transferred in the time position of the time-slot frame (i) allocated to the conference call over the section of the TDM ring circuit leading to the subscriber station.

The summation PCM word $BC_i$ obtained via the digital adder ADD is transferred over the section of the TDM ring circuit continuing from the subscriber station and, in addition, is fed to the buffer storage S formed from a 16-bit shift register in the switching arrangent shown in FIG. 2. At the same time, there appears at the output of the 16-bit shift register the preceding summation PCM word $BC_{i-1}$ stored therein from the preceding time-slot frame $i-1$ and which is now subtracted from the PCM word $AB_i$ transferred over the section of the TDM ring circuit leading to the subscriber station.

FIG. 2 shows that the subtractor may basically be formed with the aid of a digital adder add, to which, in addition to an initial carry "1", the minuend $AB_i$ is directly fed, and the subtrahend $BC_{i-1}$ is coupled to an input over a NOT element. The differential PCM word $BE_i$ obtained at the output of the subtractor is then transferred serially to the 16-bit shift register R16 and coupled from there in parallel fashion to a linear to non-linear code converter 16/8, which outputs the appropriate 8-bit PCM word in parallel fashion to the 8-bit shift register R8. From there, the 8-bit PCM word finally travels to the non-linear speech signal decoder PCM/NF of the conferee.

The principles of the invention are described hereinabove by describing the construction and operation of preferred apparatus for performing the inventive method. It is contemplated that the described apparatus can be modified or changed, as can its operating parameters, e.g., the word format or number of bits forming a word, while remaining within the scope of the invention as defined by the appended claims.

I claim:
1. A method for connecting at least three subscriber stations participating in a conference call in a time division multiplex (TDM) telecommunication system wherein the subscriber stations are connected by a TDM ring-like circuit comprising the steps of:
generating in each said participating subscriber station a first TDM signal having a value corresponding to the instantaneous speech signal amplitude issuing from that subscriber station,
adding said first signal so generated in a said participating subscriber station to an incoming TDM signal coupled to that subscriber station through a portion of said ring circuit cnnected thereto and to another said participating subscriber station to form a composite signal which is the sum of the values of said first signal and said incoming TDM signal, said incoming signal appearing in a time position allocated to the conference call,
transmitting said composite signal from said participating subscriber station wherein it is formed over another portion of said TDM ring circuit to a further subscriber station participating in the conference call,
storing said composite signal in said subscriber station where it is formed for the duration of a signal cycle through said TDM ring circuit,
subtracting a said stored composite signal from said incoming signal to produce a difference signal and
utilizing said difference signal in the said participating subscriber station where it is produced as providing the instantaneous values of the speech signal amplitudes issuing from the others of said participating subscriber stations, thereby providing the signal to be heard in said participating subscriber station.
2. The method defined in claim 1 wherein said generating step includes non-linear to linear code conversion.
3. The method defined in claim 2 wherein said non-linear-to-linear code conversion is a non-linear eight bit word to linear 16 bit word code conversion and wherein said adding step comprises mathematically adding said 16 bit word to a 16 bit word forming a said incoming signal appearing in two time slots allocated to the conference call to form a 16 bit composite word which is the sum of the added 16 bit words.

* * * * *